(12) United States Patent
Monster

(10) Patent No.: US 7,548,846 B1
(45) Date of Patent: Jun. 16, 2009

(54) LANGUAGE SENSITIVE ELECTRONIC MAIL GENERATION AND ASSOCIATED APPLICATIONS

(75) Inventor: Robert W. Monster, Issaquah, WA (US)

(73) Assignee: Global Market Insite, Inc., Seattle, WA (US)

( * ) Notice: Subject to any disclaimer, the term of this patent is extended or adjusted under 35 U.S.C. 154(b) by 876 days.

(21) Appl. No.: 10/031,263

(22) PCT Filed: Nov. 6, 2000

(86) PCT No.: PCT/US00/41973

§ 371 (c)(1),
(2), (4) Date: Oct. 19, 2001

(87) PCT Pub. No.: WO01/46850

PCT Pub. Date: Jun. 28, 2001

Related U.S. Application Data

(60) Provisional application No. 60/164,585, filed on Nov. 10, 1999.

(51) Int. Cl.
  *G06F 17/00* (2006.01)
  *G06F 17/20* (2006.01)
  *G06F 17/24* (2006.01)

(52) U.S. Cl. .......................... 704/8; 715/236; 715/265

(58) Field of Classification Search ............. 704/8
See application file for complete search history.

(56) References Cited

U.S. PATENT DOCUMENTS

| | | | |
|---|---|---|---|
| 4,816,904 A | 3/1989 | McKenna et al. | |
| 4,905,080 A | 2/1990 | Watanabe et al. | |
| 5,041,972 A | 8/1991 | Frost | |
| 5,497,319 A | 3/1996 | Chong et al. | |
| 5,535,120 A * | 7/1996 | Chong et al. | 704/3 |
| 5,568,383 A | 10/1996 | Johnson et al. | |

(Continued)

FOREIGN PATENT DOCUMENTS

EP           0528640           2/1993

(Continued)

OTHER PUBLICATIONS

U.S. Appl. No. 60/150,237, Jeff Crapo, On-line Passive Registration System and Method Aug. 23, 1999, p. 20-22.*

(Continued)

*Primary Examiner*—David R. Hudspeth
*Assistant Examiner*—Justin W Rider
(74) *Attorney, Agent, or Firm*—Perkins Coie LLP

(57) ABSTRACT

Emails that are generated, as part of an automated or semi-automated process, are to be language sensitive. It is possible, by determining the preferred language of the user of a company's information services, to customize the communication to the user, or in the case of a user using a server generating electronic mail message to a company to customize messages to the company, based on users chosen language or an automatically determined language. This customization affects two levels of an electronic mail message. The first is the actual header information provided to the custom electronic mail message to allow proper interpretation of the electronic mail message at the receiving end. The second is to customize information to be written to the addressee section of the body of the electronic mail message.

19 Claims, 13 Drawing Sheets

U.S. PATENT DOCUMENTS

| | | | |
|---|---|---|---|
| 5,835,712 | A | 11/1998 | DuFresne |
| 5,884,246 | A | 3/1999 | Boucher et al. |
| 5,966,685 | A * | 10/1999 | Flanagan et al. ............... 704/8 |
| 5,973,696 | A | 10/1999 | Agranat et al. |
| 5,987,401 | A | 11/1999 | Trudeau |
| 5,999,908 | A | 12/1999 | Abelow |
| 6,035,121 | A | 3/2000 | Chiu et al. |
| 6,041,303 | A | 3/2000 | Mathews |
| 6,044,357 | A | 3/2000 | Garg |
| 6,064,971 | A | 5/2000 | Hartnett |
| 6,138,088 | A | 10/2000 | Goeser |
| 6,161,082 | A | 12/2000 | Goldberg et al. |
| 6,219,638 | B1 * | 4/2001 | Padmanabhan et al. ..... 704/235 |
| 6,233,317 | B1 * | 5/2001 | Homan et al. ............ 379/88.05 |
| 6,256,663 | B1 | 7/2001 | Davis |
| 6,275,789 | B1 | 8/2001 | Moser et al. |
| 6,311,190 | B1 | 10/2001 | Bayer et al. |
| 6,477,504 | B1 | 11/2002 | Hamlin et al. |
| 6,513,014 | B1 | 1/2003 | Walker et al. |
| 6,564,190 | B1 | 5/2003 | Dubner |
| 6,741,967 | B1 | 5/2004 | Wu et al. |
| 6,754,635 | B1 | 6/2004 | Hamlin et al. |
| 6,792,399 | B1 | 9/2004 | Phillips et al. |
| 6,859,784 | B1 | 2/2005 | van Duyne et al. |
| 6,901,367 | B1 * | 5/2005 | Berstis et al. ............... 704/277 |
| 6,993,495 | B2 | 1/2006 | Smith, Jr. et al. |
| 2003/0200505 | A1 * | 10/2003 | Evans ......................... 715/507 |
| 2004/0064371 | A1 * | 4/2004 | Crapo ......................... 705/14 |
| 2005/0246156 | A1 * | 11/2005 | Scanlan ......................... 704/2 |
| 2007/0174108 | A1 | 7/2007 | Monster |
| 2007/0282664 | A1 | 12/2007 | Monster |

FOREIGN PATENT DOCUMENTS

| | | |
|---|---|---|
| WO | WO 94/03865 | 2/1994 |
| WO | WO-9505630 | 2/1995 |
| WO | WO 01/35252 A2 | 5/2001 |
| WO | WO 01/35295 A2 | 5/2001 |
| WO | WO-0135215 | 5/2001 |
| WO | WO 01/44981 A2 | 6/2001 |
| WO | WO-0146850 | 6/2001 |

OTHER PUBLICATIONS

U.S. Appl. No. 60/150,461, Jeff Crapo, On-line Passive Registration System and Method Aug. 23, 1999, p. 20-22.*

Decision Analyst, Inc., "American Consumer Opinion Panel", www.decisionanalyst.com, Jan. 30, 1998 [retrieved Jul. 24, 2005], pp. 1-4, retrieved from: google.com and archive.org.

American Consumer Opinions, www.acop.com, Apr. 17, 1999, [retrieved Jul. 24, 2005], pp. 1-9, retrieved from: google.com and archive.org.

Greenfield Online, www.greenfieldonline.com, May 4, 1999, [retrieved Jul. 24, 2005], pp. 1-16, retrieved from: google.com and archive.org.

Michel, Matt, "Are We Developing What Consumers Want", Contracting Business, Dec. 1997 [retrieved Jul. 24, 2005], pp. 1-4, retrieved from: Dialog, file 16.

Mosley-Matchett, J.D., "Leverage the Web's Research Capabilities", Marketing News, Apr. 13, 1998 [retrieved Jul. 24, 2005], 32(8):1-4, retrieved from: Dialog, file 15.

U.S. Appl. No. 09/744,773, filed Jan. 26, 2001, Monster.
U.S. Appl. No. 09/744,774, filed Jan. 26, 2001, Monster.
U.S. Appl. No. 09/744,775, filed Jan. 26, 2001, Monster.
U.S. Appl. No. 09/744,776, filed Jan. 26, 2001, Monster.
U.S. Appl. No. 10/031,263, filed Jan. 26, 2001, Monster.

* cited by examiner prospectiveClient1@ispToday.com/Koren
prospectiveClient2@ispHome.com/English
prospectiveClient3@ispAway.com/Japanese
.
.
prospectiveClientn@yetAnotherISP.com/Italian

```perl
sub mail_header
{
    $recip = $contact_email;                                                            510
    $sender = "advetise@globaltestmarket.com\n";                                        510

$sub_line = &get_message(57,$language);                                             520 if ($language eq 'E'  || $language eq 'FR' ||  \
        $language eq 'DE' || $language eq 'SP' ||  \
        $language eq 'IT' || $language eq 'PR')                                         530
    {
        open (MAIL, "|$mail_prog -B 8BITMIME -t");                                      540
        print MAIL "To: $recip\n";                                                      550
        print MAIL "From: $sender\n";                                                   550
        print MAIL "Reply-to: frontdesk\@globaltestmarket.com\n";                       550
        print MAIL "Subject: $sub_line\n";                                              550
        print MAIL "MIME-Version: 1.0\n";                                               560
        print MAIL "Content-Type: text/html; charset='iso-8859-1'\n";                   570
        print MAIL "Content-Transfer-Encoding: 8bit\n";                                 580
    }
    elsif ($language eq 'JP')
    {
        open (MAIL, "|$mail_prog -t");
        print MAIL "To: $recip\n";
        print MAIL "From: $sender\n";
        print MAIL "Subject: $subline\n";
        print MAIL "MIME-Version: 1.0\n";
        print MAIL "Content-Type: text/html; charset='Shift-JIS'\n";
    }
    elsif ($language eq 'CHT')
    {
```

Figure 5

```
open (MAIL, "|$mail_prog -t");
print MAIL "To: $recip\n";
print MAIL "From: $sender\n";
print MAIL "Subject: $subline\n";
print MAIL "MIME-Version: 1.0\n";
print MAIL "Content-Type: text/html; charset='big5'\n";
print MAIL "Content-Transfer-Encoding: 8bit\n";
}
elsif ($language eq 'KR')
{
    open (MAIL, "|$mail_prog -B 8BITMIME -t");
    print MAIL "To: $recip\n";
    print MAIL "From: $sender\n";
    print MAIL "Subject: $sub_line\n";
    print MAIL "MIME-Version: 1.0\n";
    print MAIL "Content-Type: text/html; charset='ks_c_5601-1987'\n";   585
    print MAIL "Content-Transfer-Encoding: 8bit\n";
}
else
{
    open (MAIL, "|$mail_prog -t");
    print MAIL "To: $recip\n";
    print MAIL "From: $sender\n";
    print MAIL "Subject: $sub_line\n";
    print MAIL "MIME-Version: 1.0\n";
    print MAIL "Content-Type: text/html; charset=UTF-8\n";
    print MAIL "Content-Transfer-Encoding: quoted-printable\n";          590
}
```

```
sub mail_header
{
    . . .
    $recip = &get_recip($language);
    . . .
    open (MAIL, "|$mail_prog -B 8BITMIME -t");
    print MAIL "To: $recip\n";
    . . .
```

Figure 9

```perl
sub get_recip
{
$the_lang = $_[0];

if ($the_lang eq 'IT')
{
$the_recip = "servizio\@globaltestmarket.com";
}
elsif ($the_lang eq 'DE')
{
$the_recip = "kundendienst\@globaltestmarket.com";
}
elsif ($the_lang eq 'NL')
{
$the_recip = "klantendienst\@globaltestmarket.com";
}
elsif ($the_lang eq 'FR')
{
$the_recip = "service\@globaltestmarket.com";
}
else
{
$the_recip = "frontdesk\@globaltestmarket.com";
} return $the_recip;
}
```

Figure 10

```
$the_title = &get_list_value(10,$lang,$title);

if ($lang eq 'JP')
{
$the_text = $lastname . ' ' . $the_text;
}
elsif ($lang eq 'KR')
{
$the_text = '';
}
else
{
$the_text = $the_title . ' ' . $firstname . ' ' . $lastname ;
}
print MAIL "<br>$the_text<br><br>\n";
```

```
sub get_list_value
{
  $list_id   = $_[0];
  $list_lang = $_[1];
  $this_val  = $_[2];

my $lst_sth = $dbh->prepare("SELECT list_text FROM lists WHERE list_id=$list_id AND list_lang = '$list_lang' AND   1210
  list_value='$this_val'");
  $lst_sth->execute or die "Unable to execute query: $lst_sth->errstr\n";
  $lst_rows = $lst_sth->rows;                                                                                        1220

$listinfo = $lst_sth->fetchrow_arrayref;
  $list_text = $listinfo->[0];                                                                                        1230
  $lst_sth->finish;

return $list_text;                                                                                                  1240
}
```

Figure 12

```
CREATE TABLE lists (
  list_id int(11) DEFAULT '0' NOT NULL,
  list_lang char(3) DEFAULT 'E' NOT NULL,
  list_sequence int(11) DEFAULT '0' NOT NULL,
  list_text varchar(50) DEFAULT '' NOT NULL,
  list_value varchar(20) DEFAULT '' NOT NULL,
  PRIMARY KEY (list_id,list_lang,list_value),
  KEY list_id_2 (list_id,list_lang,list_sequence)
);
```

LANGUAGE SENSITIVE ELECTRONIC MAIL GENERATION AND ASSOCIATED APPLICATIONS

RELATED APPLICATION

This application claims priority to U.S. Provisional Application No. 60/164,585 entitled "System and Method for Obtaining and Collating Survey Information In Real Time For Multiple Languages and Multiple Character Encodings", filed on Nov. 10, 1999, which is hereby fully incorporated by reference.

FIELD OF THE INVENTION

This invention is in the field of information processing. More specifically this invention has to do with the customization of electronic mail messages.

BACKGROUND OF THE INVENTION

When dealing with electronic mail communications that occur across language boundaries, there are two issues that come to the fore. The first is the ability of the computers to handle various languages. The second is the ability of the users of the computers to handle various languages.

Computers in general, and electronic mail more specifically, were nurtured in an environment that was largely centered around the English language. Resultantly early efforts in defining a set of characters to be used by computers were based on English. The first set of characters developed was the US-ASCII character set. This character set could be represented with 7 bits of data. A side effect of this 7 bit representation was the development of a mail transfer protocol called Simple Mail Transfer Protocol which supports only 7 bit data. The need to support the European languages, and the additional characters, relative to English, defined therein, caused a need for 8 bits of data to be used in representing an entire character set. The need to support Asian languages, with the large number of characters present in these languages, caused the required number of bits for representing these languages to grow such that 2 octets (8 bits/octet) were used to represent these character sets, and from this need developed yet more character sets. Although significant progress has been made in recent years to evolve to a unified standard, the fact remains that there are still various user agents that can only support one character set. The absence of a ubiquitous standard among user agents results in a variety of character set encoding be used to display text in a way that is appropriate for each language. Failure to match the proper character encoding with the corresponding text can render the information unviewable.

Typically, companies wishing to communicate with their customers will do so in a generic fashion. In such a case, the result is that every user of a company's system will be treated the same in an electronic communication from a company. A person in Poland will receive the same communication as a person in Japan. This can be undesirable in that communications are very language and culture sensitive. A generic message that is sent to all users of a system may be perfectly suited for one culture and alienate another culture to the point of hurting business in that country.

In a similar vane, there are times when it is desired to have information fed to the company. When things are sent to a representative of a company, one runs into a potential for the same cultural insensitive as was alluded to with respect to the generic emails.

There is a need to have a electronic mail system that can handle the disparate needs of various languages and cultures.

BRIEF DESCRIPTION OF THE DRAWINGS

FIG. 5—Embodiment to write correct header information for proper language handling.

FIG. 6—Partial character set for ISO-8859-1 (Latin 1)

FIG. 7—Partial character set for ISO-8859-7 (Greek)

FIG. 9—Portion of an embodiment to write an electronic mail header with customized electronic mail recipient based on users language.

FIG. 10—Routine to determine customized recipients electronic mail address.

FIG. 11—Embodiment to create culturally specific salutations

FIG. 12—Code example for database lookup for language specific title.

FIG. 13—Exemplary database of lists containing culturally specific titles.

SUMMARY OF THE INVENTION

Figure 1:
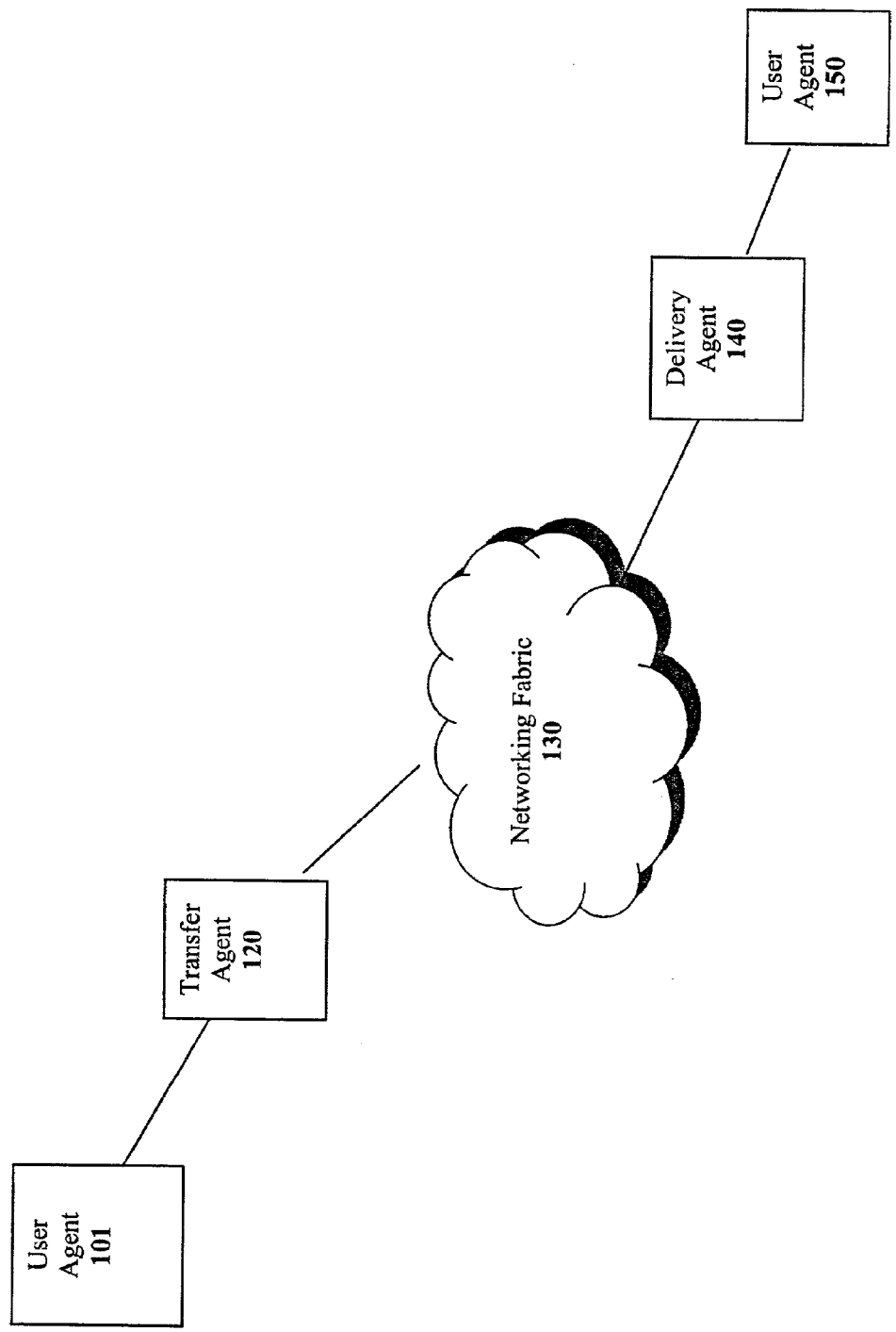
FIG. 1—Typical electronic mail passage through the Internet

Emails that are generated, as part of an automated or semi-automated process, are to be language sensitive. It is possible, by determining the preferred language of the user of a company's information services, to customize the communication to the user, or in the case of a user using a server generating electronic mail message to a company, to customize messages to the company, based on users chosen language or an automatically determined language. This customization affects two levels of an electronic mail message. The first level of customization is the header information provided to the electronic mail message to allow proper interpretation of the electronic mail message on the way to and once received at the receiving end. In one embodiment of the present invention, the MIME-Version, Content-Type, and Content-Transfer-Encoding are all customized based on the appropriate language. The second level of customization is to customize information to be written to the addressee section of the body of the electronic mail message to improve user perception of a generated email. In one embodiment of the present invention, the recipient of an electronic mail is expressed in a manner dependent on the chosen language. In one embodiment of the present invention, the salutation to a recipient of an electronic mail message is customized based on the chosen language.

DETAILED DESCRIPTION OF THE INVENTION

In the following description, various aspects of the present invention will be described. However, it will be apparent to those skilled in the art that the present invention may be practiced with only some or all aspects of the present invention. For purposes of explanation, specific numbers, materials and configurations are set forth in order to provide a thorough understanding of the present invention. However, it will also be apparent to one skilled in the art that the present invention may be practiced without the specific details. In other instances, well known features are omitted or simplified in order not to obscure the present invention.

Parts of the description will be presented in terms of operations performed by a processor based device, using terms such as data, tables, requesting, determining, retrieving, displaying, and the like, consistent with the manner commonly employed by those skilled in the art to convey the substance of their work to others skilled in the art. As well understood by those skilled in the art, the quantities take the form of electrical, magnetic, or optical signals capable of being stored, transferred, combined, and otherwise manipulated through mechanical and electrical components of the processor based device; and the term processor include microprocessors, micro-controllers, digital signal processors, and the like, that are standalone, adjunct or embedded.

Various operations will be described as multiple discrete steps in turn, in a manner that is most helpful in understanding the present invention, however, the order of description should not be construed as to imply that these operations are necessarily order dependent. In particular, these operations need not be performed in the order of presentation. Further, the description repeatedly uses the phrase "in one embodiment", which ordinarily does not refer to the same embodiment, although it may.

Overview

The present invention deals with two main issues. First is the automated insertion in an electronic mail, a header including language information to aid in the transfer of the electronic mail message to the receiving end user agent. Second is the writing of information to the addressee section of the body of the electronic mail message in a language dependent manner to provide a more user-friendly experience to the users (the sender as well as the recipient).

FIG. 1 shows a typical route of an electronic mail message as it is sent via the Internet. The user agent 101 is an application typically run by a user. The user agent will be used to compose and send the outgoing message. The transfer agent 120 is used to transfer the message to the message's final destination through networking fabric 130. The networking fabric 130 is comprised of switching/routing devices known in the art. The delivery agent 140 is used to place the message into the end users mailbox (not shown). The end user will then use a user agent 150 to view the message.

An electronic mail message can be viewed as consisting of two parts. The first part is the header. The header contains various "internal" fields that impart information about various aspects of the electronic mail message. These aspects of an electronic mail message typically include; the electronic mail address of the sender, the electronic mail address of the recipient, the subject, the time of creation and delivery information. There is a particular format for each header entry. Each entry in the header is of the form "keyword: value". There is always a blank line between the header and the body of the electronic mail message. The contents of the header are provided mainly by the user agent 110 that is helping the user create the electronic mail message. Some elements are provided by the user to the user agent for putting into the proper header format in the electronic mail message.

The second part of the electronic mail message is the body of the electronic mail message, including typically an addressee section and a message text section. This is typically provided by the user. The user will typically have a user agent with some kind of text editing capability. The user will type in the body of the message using this text editor. More detailed information on the fundamentals of electronic mail messages can be read in Request For Comment (RFC) 822. This document is incorporated herein by reference.

User agents 101 and 150 typically execute on respective user computer systems, while transfer and delivery agents 120 and 140 typically execute on respective servers. Examples of suitable user computer systems include palm sized personal digital assistants, notebook size computers, and desktop computers, as well as set top boxes (with storage medium storing the programming instructions implementing user agents 101 and 150 and at least one processor coupled to the storage medium to execute the programming instructions), available from manufacturers such as Palm Computing, of San Jose, Calif. and Dell Computer of Austin, Tex. Similarly, suitable servers include a wide range of servers available from manufacturers such as IBM of Armonk, N.Y. and Sun Microsystems of Menlo Park, Calif.

Figure 2:
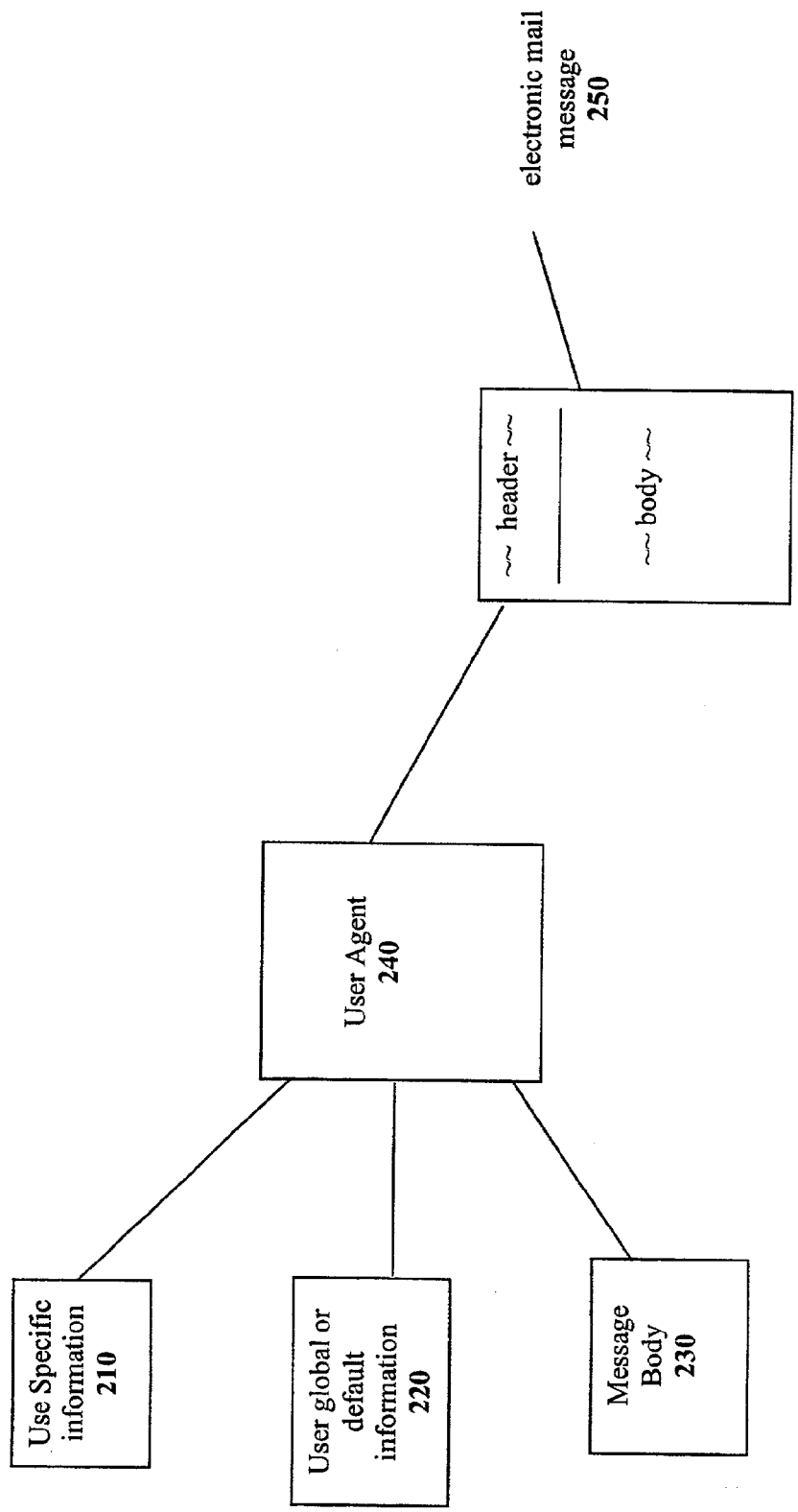
FIG. 2—Typical electronic mail compilation stage.

FIG. 2 shows a typical method for composing electronic mail messages. In the typical flow, the user agent will utilize three type of information to generate a complete electronic mail message. The first type of information that the user agent 240 will need in order to create header entries in the electronic mail message is "use-specific" information 210. The "use-specific" information 210 will vary, in most instances, with every electronic mail message. A typical example of what "use-specific" information 210 would be the recipient's electronic mail address. The user agent 240 will take the recipient's electronic mail address for this message and write the proper field to the electronic mail message header.

The second type of information a user agent 240 would typically look to is either user specified global (e.g. across many electronic mail messages) information or default (if there is none specified) or system information 220. Examples of this type of information would be the date and time stamp of the electronic mail. This second type of information will make up the remainder of the header information.

Finally, the user agent 250 will typically write the body (including the addressee section) as provided 230 by the user to the user agent 250. Increasingly electronic mail messages are automatically generated as part of a larger application system. In one embodiment of the present invention shown in FIG. 3, the server 320 is providing an advertisement to a number of prospective clients. In this case, the server 320 is acting as both the user agent and the first transfer agent. Acting in its capacity as a user agent, the server will generate the electronic mail message to be transferred. In this embodiment of the invention, the electronic mail message will be generated from two sources of information. The first source is an advertisement from an advertisement database 330. In one embodiment of the present invention, the advertisement databases will have separate advertisements for each language supported by the present invention. The second source will be information about the prospective client from a prospective client database 310. In one embodiment, the server of an automated system can read information about a user's language from the client database 330. From this information about the user, the server can then choose from the selection of different language versions of the advertisement in the advertisement database, the appropriate version to be sent to the users. This advertisement can then be written to the body of an electronic mail message.

Figure 3:
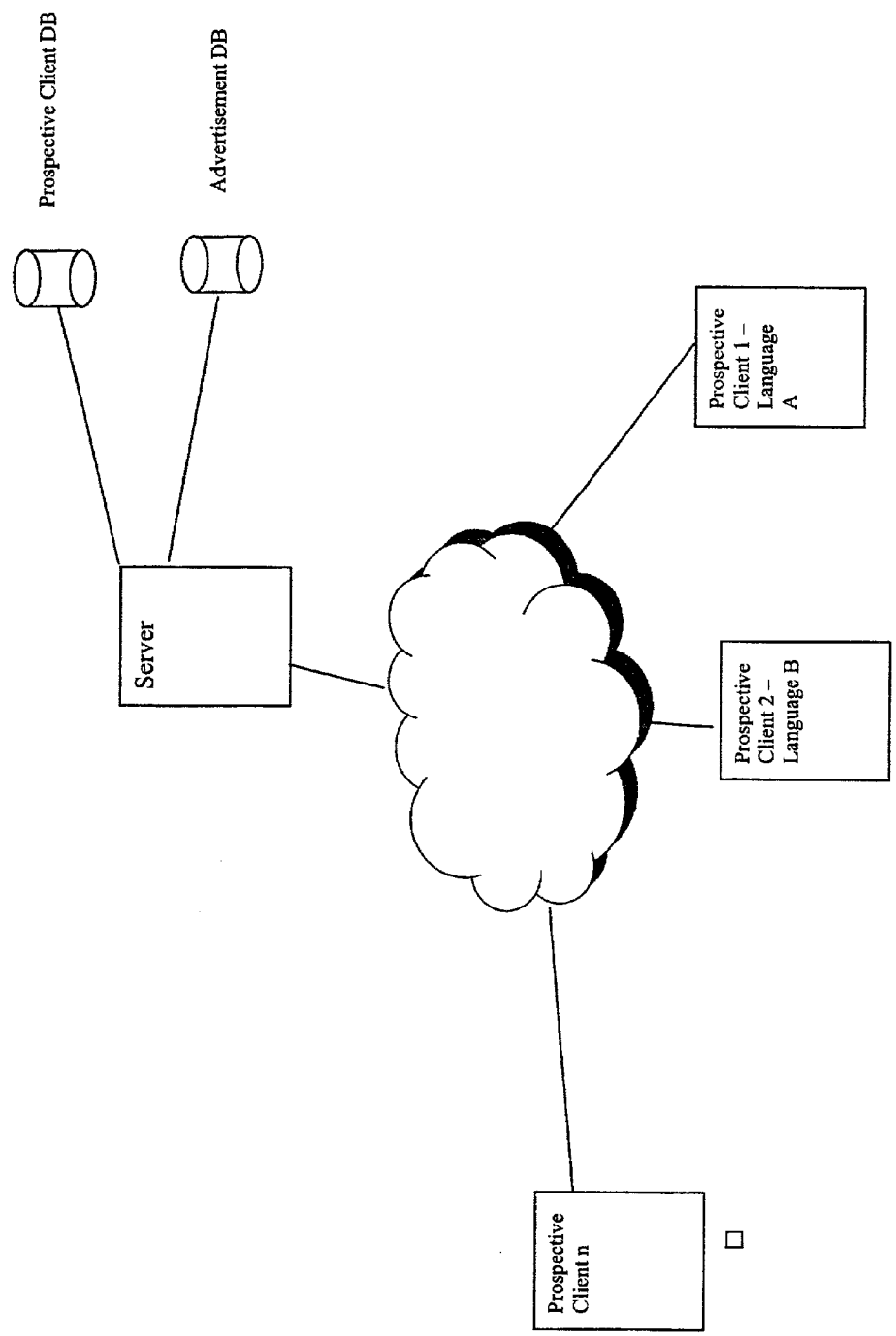
FIG. 3—System generation of electronic mail message
Figures 4A, 4B:
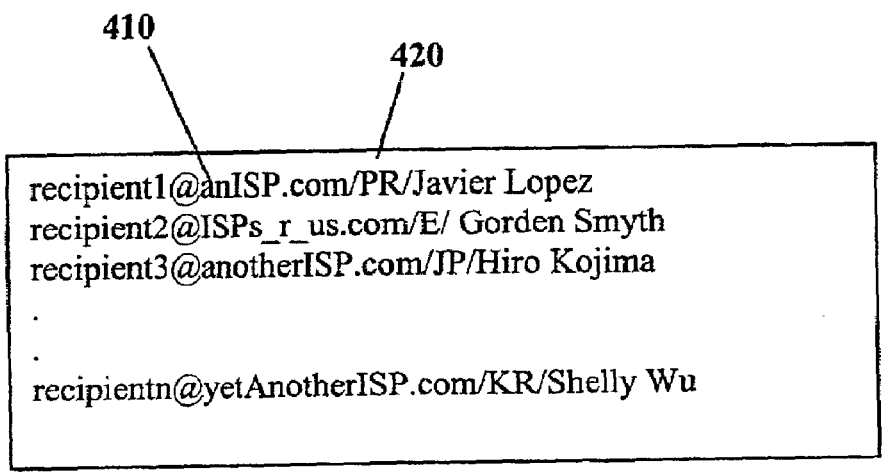
FIG. 4A, 4B—Examples embodiment of client databases

FIG. 4A shows the contents of a typical prospective client database 310 used in the embodiment of FIG. 3. In this embodiment of the present invention, the database will contain a recipient's electronic mail address. Additionally, we see that there is an indication of the electronic mail recipients' language of choice. For example, we see that user of the system whose electronic mail address is prospectiveClient@ispToday.com 410 has a language preference of Korean.

Proper Encoding

As will be understood by those skilled in the art, this discussion assumes some knowledge of the standards as set forth in the documentation for the Multipurpose Internet Mail Extensions (MIME). The Network Working Group's RFCs 2045-2049 define this standard and these documents are incorporated herein by reference.

It is desirable to make sure that a recipient will be able to read an electronic mail message. To that end, the present invention is concerned with, among other things, the automatic customization of header information, in an electronic mail message, to allow the message to be passed through to the recipient correctly.

Assume, for example, that an advertisement is customized to a particular language, say German. Further, lets say that the advertisement is written in text/plain and is written using the iso-8859-1 character set. In such a case, if an electronic mail message containing this advertisement is sent via the Internet, without the proper header information, it may well be ill received at the recipients end. This is due to the fact that iso-8859-1, an 8 bit character set, will be interpreted, by default, as a 7 bit US-ASCII character set. So, for example, when this 8 bit data is received, by an a transfer agent running Simple Mail Transfer Protocol (SMTP), which restricts electronic mail messages to 7 bit US-ASCII data, reliable and consistent handling of the message is not guaranteed.

In the present invention, when an electronic mail is generated automatically, it is desirable to be able to customize the electronic mail message to the recipient to avoid the aforementioned problems. FIG. 5 shows a section of code, from one embodiment of the present invention, designed to write the proper header information to an electronic mail message based on a language identifier.

Referring to the embodiment shown in FIG. 4B, we see a list of electronic mail addresses that represent purchasers of defective tires that have been recalled. In this embodiment, there exists a special electronic mail message notification of the recall. The message exists in various languages in a database. Based on the recipients preferred language, a message is sent in their language with the proper heading information. Take for example the first entry in the database shown in FIG. 4B. In this case, the electronic mail address is recipientl@anISP.com. In this embodiment, we see additional information is provided. For example, we see that the user whose electronic mail address is recipientl@anISP.com has a preferred language of Portuguese as indicated by the identifier PR. Finally, we see that this database tracks the user's name.

FIG. 5 shows an embodiment of a routine to aid in the writing of a correct, language sensitive electronic mail. In one embodiment, the database shown in FIG. 4B can be used by the mail_header routine of FIG. 5. The mail_header routine is called to write the appropriate header information to the electronic mail message header.

The electronic mail address 410 and language fields 420 are parsed by the server and stored globally in the variables $contact_email and $language, respectively, prior to the call of the mail_header routine. Additionally, in this automated environment, there will be another routine that will access the database containing the message to be sent. The database will have a representation of the message in all languages supported by the server.

The first step in this routine is to assign the recipient and sender addresses. In this case, the sender is an account called advertise@globaltestmarket.com. The recipient is simply determined by the $contact_email variable 510. For the first candidate from the example file of FIG. 4, we have a $language=PR and $recip recipientl@anISP.com.

The next step is to get the language specific subject line. In one embodiment, the subject line will be ascertained by the call to the routine get_message 520. Sent along to the call to the get_message routine, as shown in FIG. 5, is the field identifier of the subject line (57) and the language of interest ($language). In this example, the $language would be used to fetch the proper message from the database and the field identifier would allow proper indexing into the message to determine the subject line in the specific language. The get_message routine will return a string containing the subject of the message in the appropriate language for the recipient.

In the embodiment shown, the processing of the specific header information to be placed in the electronic mail message is begun at this time. This is handled by the 'if' statement shown. The language for the first entry being Portuguese (PR), the if-statement will test true in the first test condition. The first line will open an output pipe to $mail_prog. In this embodiment, the mail program used is Sendmail V8.8 running on a Linux OS. One skilled in the art will understand that the transfer agent utilized and the operating system upon which this invention is implemented are not relevant to the novelty of the present invention. In this example, since the message will be transmitted using an 8 bit character set, the code will inform sendmail that it is to use the 8 bit extension to SMTP (ESMTP) for this message. This is done via the "-B 8BITMIME" option to sendmail. In the next step, information about the sender, receiver, subject and reply-to are written to the electronic mail header 550.

Finally for this embodiment are the three fields that are used to specifically identify the information required to accommodate differences in character sets and MIME types. The MIME-Version header field 560 will be written to inform transfer, delivery and end user agents of which version of the Internet message body format standard to which this message complies. This is the chief header entry to inform the agents how to interpret the other header fields. The next field is the Content-Type field 570 and its associated character code set (charset) parameter. In this example, it defines the content type as text. The subtype is defined as HTML. The charset parameter informs the end user agent how to translate the character encoding in this message. Further clarification on the character set encoding issue is required.

Figure 6:
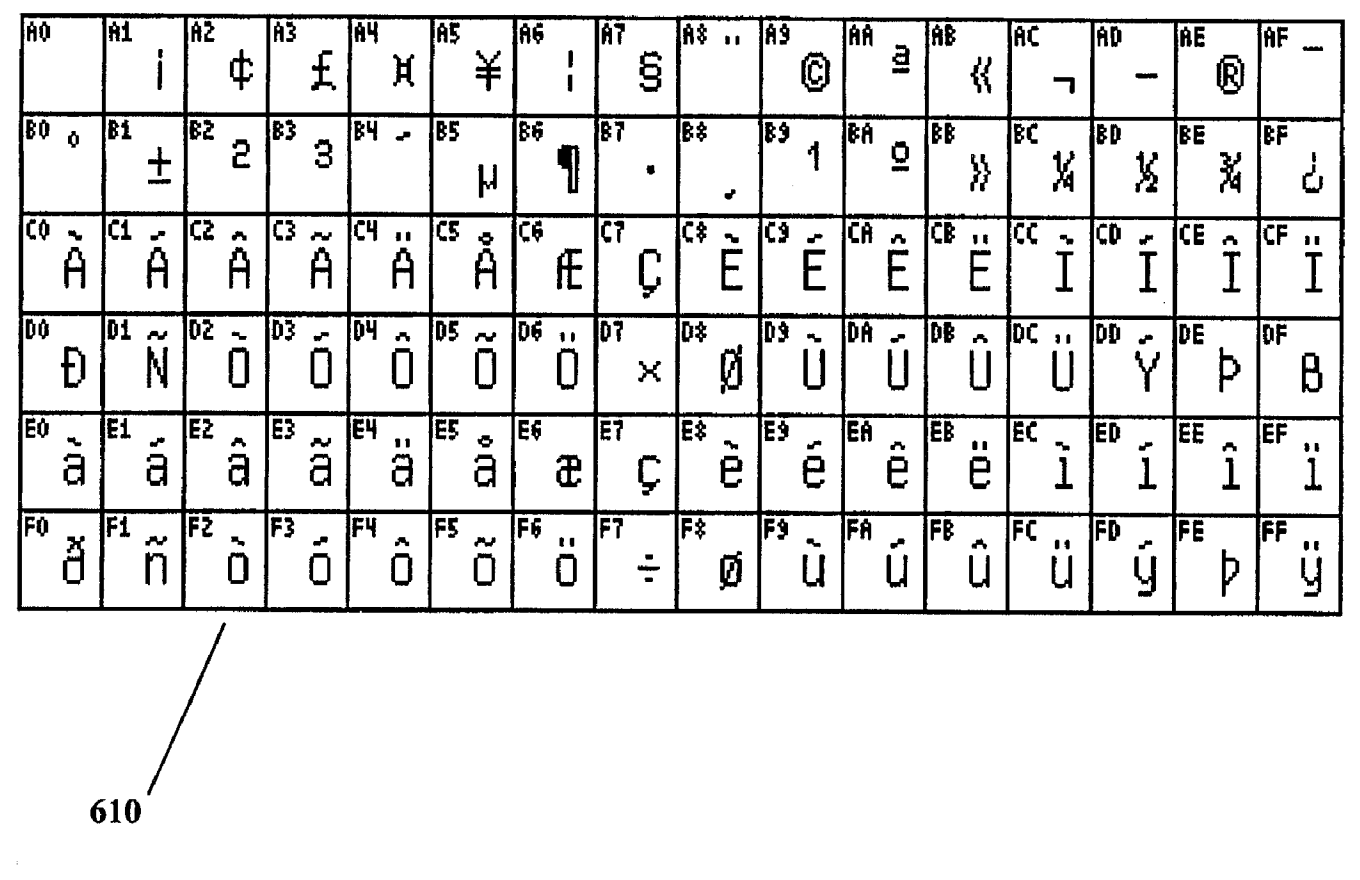
Figure 7:
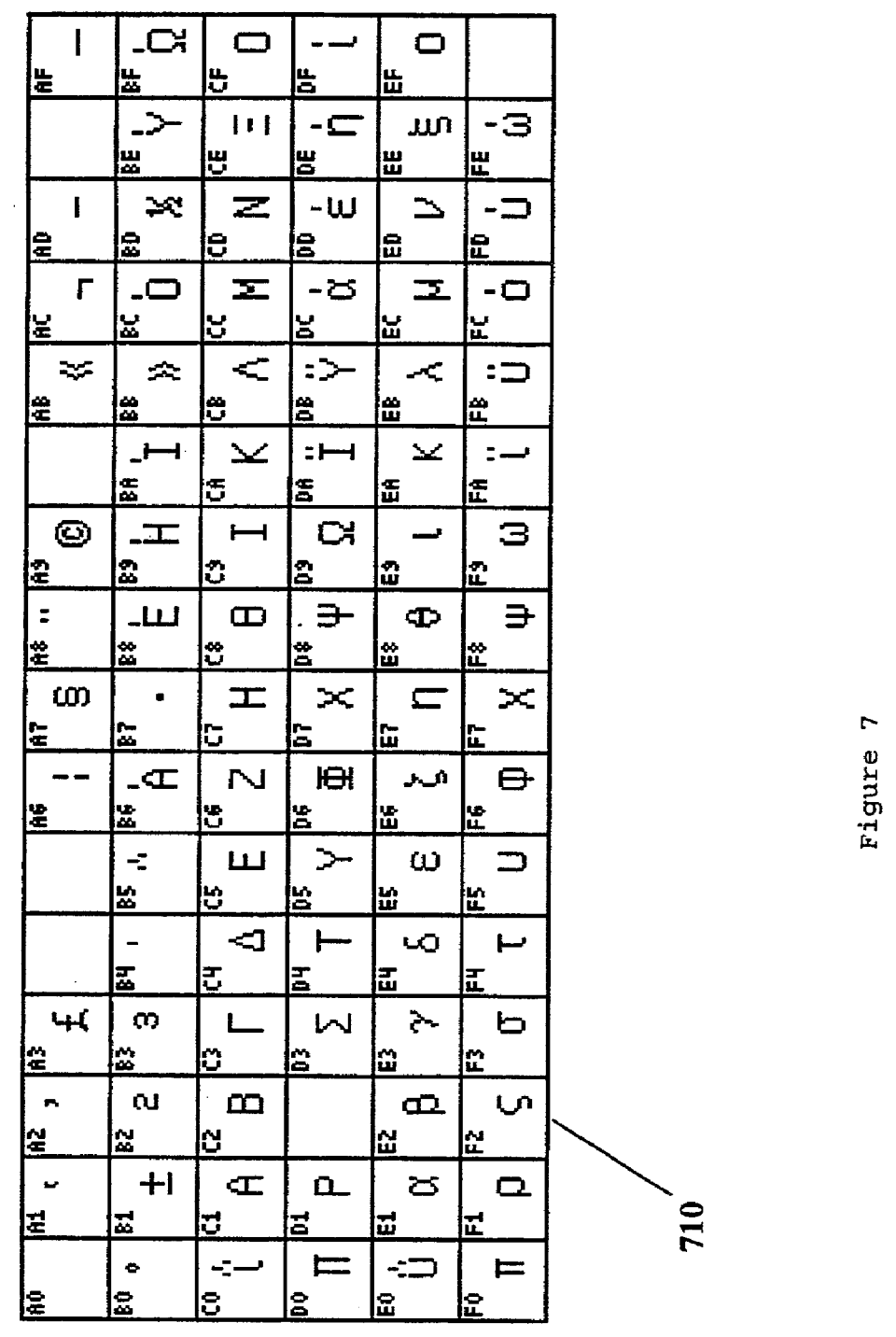

FIGS. 6 and 7 show the character encoding for two different character sets. FIG. 6 shows the a partial character set for ISO-8859-1 (Latin 1) and FIG. 7 shows the corresponding portions of the character set for ISO-8859-7 (Greek). Character sets provide a way of determining what a given octet will represent graphically. The two figures shown show the encodings for A0 (160 decimal) to FF (255 decimal) for two different types of encodings. As shown in FIG. 6, if the ISO-8859-1 character set is in use, then the character that corresponds to a F6 octet 610 is and "O" with an umlaut. If as shown in FIG. 7, however, the ISO-8859-7 character set is in use, then the character that corresponds to a F6 octet 710 is the Greek letter phi. The charset parameter informs the receiving client which character set was used to create the body of the electronic mail message. Resultantly the charset parameter informs the receiving agent how to properly translate the octets to characters. Proper identification of this parameter is critical in the correct handling of the electronic mail message as received by the user of the system.

The last of the three fields is the Content-Transfer-Encoding field 580.

When using character sets which require greater than 7 bits to represent the entire character set (e.g. 8 bit or multi octet), special processing may be required when an electronic mail message is transferred. For example, if a transfer agent has a message with 8 bit data, and it cannot negotiate the transfer of this message as 8 bit, it will need to encode the message into 7 bit, short line format. When a user agent creates a electronic mail message, the user agent may perform the encoding at the outset. In the present embodiment, FIG. 5 shows an example where an electronic mail message, which was written using the UTF-8 character set 585, is to be encoded into a message that will be in 7-bit, short line format using the "quoted-printable" encoding transformation. For further information regarding the Content-Transfer-Encoding syntax and semantics, refer to Network Working Group RFC 2056§6.

Recipient Expressed in the Preferred Language

Another aspect of the present invention is automatically expressing the recipient of a generated email in a language dependent manner, i.e. in accordance with a user's preferred language. An area where using a customer's language may be an advantage is in the customer service arena. Typically, when requesting support via electronic mail, the user will be provided an electronic mail address to which an electronic mail message should be sent. An aspect of the present invention will customize the expression of a recipient of an electronic mail message based on the users specified language.

Figure 8:
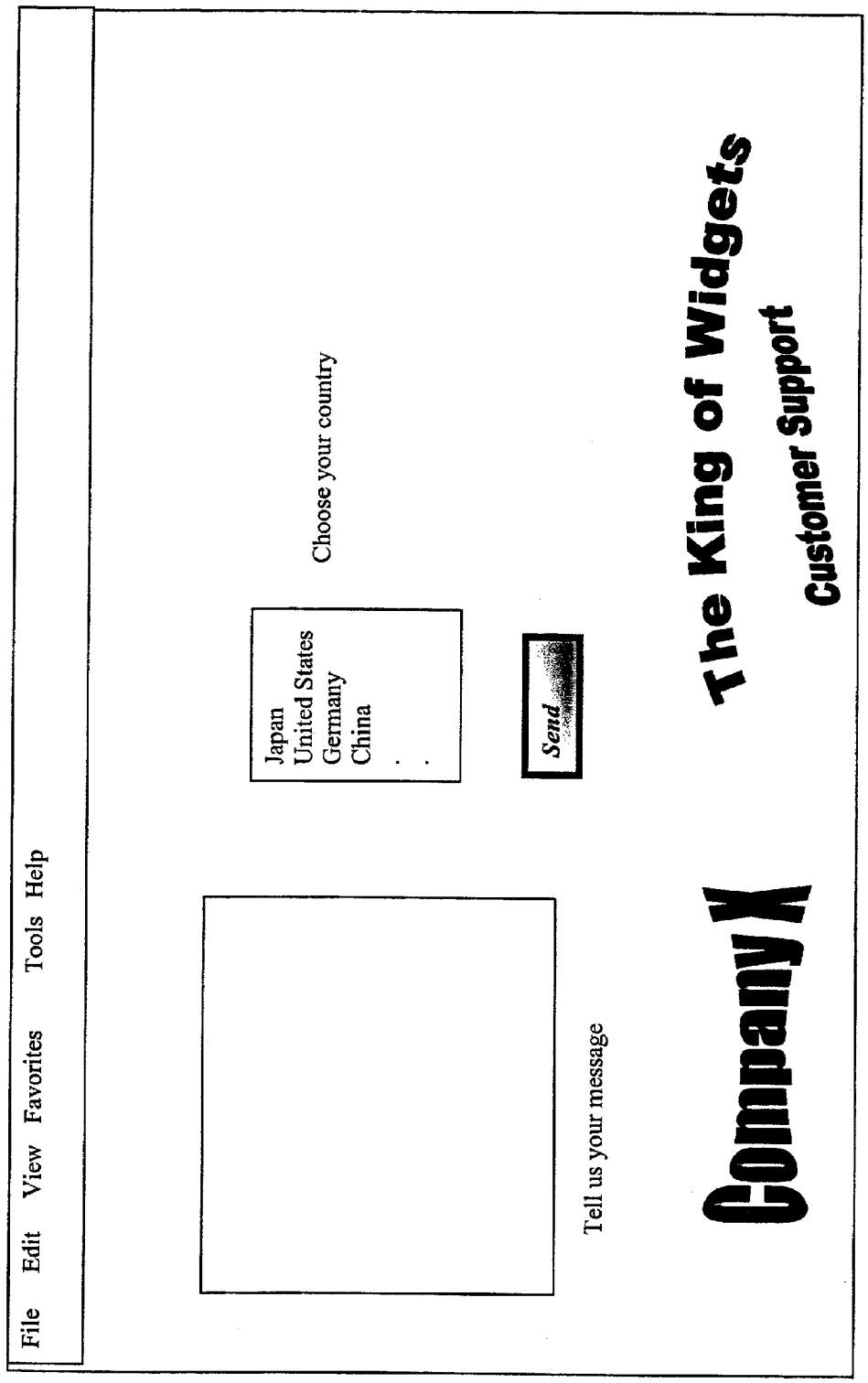
FIG. 8—Embodiment of a website with selection for of a language.

In one embodiment, as shown in FIG. 8, the user has accessed a website for customer support for Company X's widgets. From this generic start screen for the customer support website, the user will pick the country from which he is operating. The user may, in this embodiment, enter a help request directly to the appropriate person. This appropriate person is determined by specific customization that can occur based on the user's language selection.

In one embodiment, after composing the text of a text window built from HTML, the user clicks on send. Upon clicking on send, the javascript code will dynamically create the electronic mail message. The code will do so using techniques similar to the ones previously discussed, to generate the header information based on the users language. However, there is an additional level of customization that will occur in this case. FIG. 9 shows a code snippet for a routine whose job it is to send the electronic mail message that was composed in FIG. 8. Here we can see that the destination of the electronic mail message will be based on the $recip variable. This variable is set during a call to the routine get_recip. FIG. 10 shows the get_recip routine. The language of the user is passed to it. Based on this language value, we see that a language specific recipient electronic mail address is chosen. This method, vis-à-vis a single electronic mail addressee for all customer service requests, provides several advantages. First, the electronic mail will be sent to the proper recipient initially, without having to be routed though another primary customer service address. This can result in time saving because there may be a delay in processing due to differences in time zone. Second, if there is trouble with the primary customer service mail server, this may not affect the other mail servers, enable this dynamic electronic mail message to be sent. Another advantage is that generic recipient names, such as marketing or service organization names, and so forth, can be generated in the native language.

Cultural Specific Dynamically Created Salutation

Another customization that can be performed based on a user's language preference is the use of cultural appropriate salutations. Salutations vary from one culture to another (and hence, roughly from one language to another). For example in English, the preferred method of addressing someone in a professional letter would be "Ms./Mr./Mrs./Miss <firstname> <lastname>". In contrast, in Japanese a salutation is done with the family name first, followed by honorific title. It would be inappropriate, for example, to use the English standard when addressing users from Japan. It is possible to use database and program logic to customize the salutations to users based on language.

In one embodiment, assume that a user's language has been determined and, via some program logic, has been placed in the variable $lang. Refer at this time to FIGS. 11, 12 and 13. FIGS. 11, 12 and 13 show an embodiment of the invention using Perl and SQL code for creating a culturally sensitive salutation. Referring to the Perl code of FIG. 11, we see that a call to a routine get_list_value 1101 is made. The get list_value routine is shown in FIG. 12. The routine is provided with a language identifier ($lang) and the identifier in the database for the list where the salutations are located (10) and the equivalent "salutation key" to be returned ($title—e.g. Mr. or Mrs.). With this information, a query is made into the database 1210 and a field is returned 1220. The get_list_value routine then parses the database field returned by the query 1220 to get the appropriate salutation 1230. The salutation is then returned 1240. So to summarize, this routine only returns what the appropriate salutation is for a language, not what the format is. Returning to FIG. 11, we see that this is where the salutation is created. A test is made for the language defined for the recipient of the message. Assuming that the language was Japanese, the salutation that would be returned by the get_list_value query would be "san". Assuming further that the $lastname of the recipient of the message is Kojima. The appropriate 0salutation of "Kojima-san" would be created by the program logic shown in FIG. 11.

Application to Multi-Region Market Research Study

A particular application of the above described language based generation of email is in the area of multi-region market research study, involving regions where multi-language are spoken. Such market research studies, especially ones involving automatically generated emails from the market research study service to the panelists, can benefit from the present invention. Conducting and processing multi-region market research studies is the subject of co-pending U.S. patent application number <to be assigned>, entitled Multi-Region Market Research Study Processing, filed contemporaneously and having common inventorship with the present application. The application is hereby also fully incorporated by reference.

CONCLUSION

Thus, it can be seen from the above descriptions, a novel method of handling electronic mail message in a manner that is sensitive to the language of the user of a system is presented. While the present invention has been described in terms of the above-illustrated embodiments, those skilled in the art will recognize that the invention is not limited to the embodiments described. The present invention can be practiced with modification and alteration within the spirit and scope of the appended claims. The description is thus to be regarded as illustrative instead of restrictive on the present invention.

What is claimed is:

1. A method comprising:

receiving at least one instruction to automatically generate a set of language-specific electronic mail messages containing content associated with marketing research, wherein the at least one instruction includes an indication of a list of recipients and an indication of a pre-assembled content set for use in automatically generating the set of language-specific electronic mail messages containing the content associated with marketing research, the pre-assembled content set including at least a first version of the content in a first language and a second version of the content in a second language;

based on the received instruction, automatically generating the set of language-customized electronic mail messages containing the content associated with marketing research, wherein at least a first one of the electronic mail messages is customized for a first recipient having a first language preference, wherein at least a second one of the electronic mail messages is customized for a second recipient having a second language preference, and wherein automatically generating each of the language-customized electronic mail messages in the set includes:

identifying a preferred language of an electronic mail recipient from the list of recipients;

selecting and writing header information to an electronic mail message based on the identified preferred language, wherein the header information includes character coding information that is selected based on the preferred language;

selecting, from the pre-assembled content set, a language-appropriate version of the content associated with marketing research based on the identified preferred language; and writing a body to the electronic mail message, wherein the writing includes inserting the selected language-appropriate version of the content associated with marketing research; and sending each of the language-customized electronic mail messages to an appropriate electronic mail recipient.

2. The method of claim 1 wherein the preferred language is identified by querying a database of the system.

3. The method of claim 1 wherein the character coding information comprises one or more of a MIME-Version header field, a content type header field, a content transfer encoding field and a character set parameter of the content type header field.

4. The method of claim 1 wherein the recipient is expressed in a manner dependent on the preferred language.

5. The method of claim 4 wherein the method further comprises sending the electronic mail message to the recipient expressed in the language dependent manner.

6. The method of claim 1 wherein the method further comprises selecting an at least partially completed, pre-assembled culturally appropriate salutation for the recipient based on the preferred language.

7. The method of claim 6 further comprising automatically completing the at least partially completed, pre-assembled culturally appropriate salutation based on the recipient's name and the preferred language; and writing to a body of the electronic mail message the completed culturally appropriate salutation.

8. A method comprising:

receiving, as part of an electronic mail generation system, at least one instruction to automatically generate a set of language-specific electronic mail messages including content associated with marketing research, wherein the at least one instruction includes an indication of a list of recipients and an indication of a pre-assembled content set for use in automatically generating the set of language-specific electronic mail messages containing the content associated with marketing research, the pre-assembled content set including at least a first version of the content in a first language and a second version of the content in a second language;

determining, as part of the electronic mail generation system, a preferred language of an electronic mail recipient from the list of recipients, wherein the electronic mail generation system is a part of a market research system;

selecting and writing header information to an electronic mail message based on the preferred language;

based on the preferred language, selecting from the pre-assembled content set, a language-appropriate version of the content and writing a body to the electronic mail message, wherein the body includes the selected language-appropriate version of the content; and sending the electronic mail message to the electronic mail recipient.

9. The method of claim 8 wherein the electronic mail message is generated automatically in response to an event of the market research system.

10. An apparatus comprising:

a storage medium having stored therein a plurality of programming instructions designed to perform a plurality of operations, including a first operation to determine, as part of an electronic mail generation system, a preferred language of an electronic mail recipient, a second operation to write header information to an electronic mail message based on the preferred language, a third operation to select, based on the preferred language, a version of content for writing to the body of the electronic mail message, wherein the version of content is selected from a collection of content that includes multiple versions of the content, including a first version of the content that has been pre-translated into a first language and a second version of the content that has been pre-translated into a second language;

a fourth operation to write a body to the electronic mail message, wherein the writing includes inserting the selected version of content; and a fifth operation to send the electronic mail message to the electronic mail recipient; and a processor coupled to the storage medium to execute the programming instructions.

11. The apparatus of claim 10 wherein the programming instructions are also designed to perform a sixth operation to query a database of the system to determine the preferred language.

12. The apparatus of claim 10 wherein the programming instructions are designed to include in said header information, character coding information based on the preferred language.

13. The apparatus of claim 12 wherein the character coding information comprises one or more of a MIME-Version header field, a content type header field, a content transfer encoding field and a character set parameter of the content type header field.

14. The apparatus of claim 10 wherein the programming instructions expresses the recipient in a manner based at least in part on the preferred language.

15. The apparatus of claim 14 wherein the programming instruction are further designed to send the electronic mail message to the recipient expressed in the language dependent manner.

16. The apparatus of claim 10 wherein the programming instructions are further designed to determine a culturally appropriate salutation for the recipient based on the preferred language.

17. The apparatus of claim 16 wherein the programming instructions are further designed to construct the culturally appropriate salutation based on the recipient's name and the preferred language, and to write to a body of the electronic mail message the culturally appropriate salutation.

18. An apparatus comprising:
    a storage medium having stored therein a plurality of programming instructions designed to perform a plurality of operations, including
        a first operation to determine, as part of an electronic mail generation system, a preferred language of an electronic mail recipient,
        a second operation to write header information to an electronic mail message based on the preferred language,
        a third operation to select, based on the preferred language, a version of content for writing to the body of the electronic mail message, wherein the version of content is selected from a collection of content that includes multiple versions of the content, including a first version of the content that has been pre-translated into a first language and a second version of the content that has been pre-translated into a second language;
        a fourth operation to write a body to the electronic mail message; and
        a fifth operation to send the electronic mail message to the electronic mail recipient; and
    a processor coupled to the storage medium to execute the programming instructions, wherein the electronic mail generation system is a market research system, and the programming instructions further implement the market research system.

19. The apparatus of claim 18 wherein the programming instructions automatically generate the electronic mail message in response to an event of the market research system.

* * * * *

UNITED STATES PATENT AND TRADEMARK OFFICE
CERTIFICATE OF CORRECTION

PATENT NO. : 7,548,846 B1
APPLICATION NO. : 10/031263
DATED : June 16, 2009
INVENTOR(S) : Robert W. Monster It is certified that error appears in the above-identified patent and that said Letters Patent is hereby corrected as shown below:

In column 2, line 7, after "Internet" insert -- . --.

In column 2, line 9, after "message" insert -- . --.

In column 2, line 10, after "databases" insert -- . --.

In column 2, line 13, after "(Latin 1)" insert -- . --.

In column 2, line 14, after "(Greek)" insert -- . --.

In column 2, line 23, after "salutations" insert -- . --.

In column 4, lines 39-61, after "agent 250." delete "Increasingly electronic mail messages are automatically generated as part of a larger application system. In one embodiment of the present invention shown in FIG. 3, the server 320 is providing an advertisement to a number of prospective clients. In this case, the server 320 is acting as both the user agent and the first transfer agent. Acting in its capacity as a user agent, the server will generate the electronic mail message to be transferred. In this embodiment of the invention, the electronic mail message will be generated from two sources of information. The first source is an advertisement from an advertisement database 330. In one embodiment of the present invention, the advertisement databases will have separate advertisements for each language supported by the present invention. The second source will be information about the prospective client from a prospective client database 310. In one embodiment, the server of an automated system can read information about a user's language from the client database 330. From this information about the user, the server can then choose from the selection of different language versions of the advertisement in the advertisement database, the appropriate version to be sent to the users. This advertisement can then be written to the body of an electronic mail message." and insert the same on Col. 4, line 40 as a new paragraph.

UNITED STATES PATENT AND TRADEMARK OFFICE
CERTIFICATE OF CORRECTION

PATENT NO. : 7,548,846 B1
APPLICATION NO. : 10/031263
DATED : June 16, 2009
INVENTOR(S) : Robert W. Monster It is certified that error appears in the above-identified patent and that said Letters Patent is hereby corrected as shown below:

In column 6, line 6, delete "$recip recipient1@anISP.com." and insert
-- $recip=recipient1@anISP.com. --, therefor.

In column 8, line 12, delete "<Iastname>" and insert -- <lastname> --, therefor.

In column 8, line 24-25, delete "get list_value" and insert -- get_list_value --, therefor.

In column 8, line 41, delete "Osalutation" and insert -- salutation --, therefor.

Signed and Sealed this

Fifteenth Day of September, 2009

David J. Kappos
*Director of the United States Patent and Trademark Office*